US009002298B2

(12) United States Patent
Karlsson et al.

(10) Patent No.: US 9,002,298 B2
(45) Date of Patent: Apr. 7, 2015

(54) CAPACITIVE DATA TRANSFER THROUGH A USER'S BODY

(71) Applicant: Sony Mobile Communications AB, Lund (SE)

(72) Inventors: Peter Karlsson, Lund (SE); Kåre Agardh, Rydebäck (SE); Daniel Lönnblad, Genarp (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 239 days.

(21) Appl. No.: 13/664,294

(22) Filed: Oct. 30, 2012

(65) Prior Publication Data

US 2013/0165048 A1    Jun. 27, 2013

Related U.S. Application Data

(60) Provisional application No. 61/578,922, filed on Dec. 22, 2011.

(51) Int. Cl.
*H04M 1/05* (2006.01)
*H04W 4/00* (2009.01)
*H04M 1/725* (2006.01)
*H04M 1/60* (2006.01)

(52) U.S. Cl.
CPC ............... *H04W 4/008* (2013.01); *H04M 1/05* (2013.01); *H04M 1/7253* (2013.01); *H04M 1/6066* (2013.01)

(58) Field of Classification Search
CPC ..... H04W 4/008; H04M 1/05; H04M 1/6066; H04M 1/7253

USPC ........... 455/100, 41.1, 41.2, 168.1, 188.1, 15, 455/127.1; 340/573.1, 522, 539.1
See application file for complete search history.

(56) References Cited

U.S. PATENT DOCUMENTS

| | | | | |
|---|---|---|---|---|
| 5,822,126 A | * | 10/1998 | Cursolle et al. | 359/630 |
| 7,171,177 B2 | * | 1/2007 | Park et al. | 455/188.1 |
| 7,248,928 B2 | * | 7/2007 | Yagi | 607/54 |
| 7,664,476 B2 | * | 2/2010 | Yanagida | 455/188.1 |
| 7,725,089 B2 | * | 5/2010 | Lee et al. | 455/188.1 |

(Continued)

FOREIGN PATENT DOCUMENTS

WO    2006120582 A1    11/2006
WO    2008025869 A1    3/2008

OTHER PUBLICATIONS

Zimmerman, T.G., "Personal Area Networks: Near-field intrabody communication." IBM Systems Journal, vol. 35, Nos. 3 & 4, pp. 609-617. 1996. IBM, Armonk, NY.

(Continued)

*Primary Examiner* — Minh D Dao
(74) *Attorney, Agent, or Firm* — Coats & Bennett, PLLC

(57) ABSTRACT

A wireless communications device includes a Personal Area Network (PAN) transceiver that communicates data with a corresponding PAN transceiver disposed in a hands-free visor. The device also includes a short-range transceiver that communicates with a corresponding short-range transceiver in the hands-free visor. Both the wireless communications device and the hands-free device are configured to select which of these transceivers it is to use to transmit data based on predefined criteria.

18 Claims, 6 Drawing Sheets

(56) References Cited

U.S. PATENT DOCUMENTS

| | | | |
|---|---|---|---|
| 2008/0037727 A1* | 2/2008 | Sivertsen et al. | 379/88.13 |
| 2009/0004982 A1 | 1/2009 | Kim et al. | |
| 2009/0045770 A1* | 2/2009 | Lin | 320/101 |
| 2009/0214070 A1* | 8/2009 | Kwon et al. | 381/376 |
| 2010/0298669 A1 | 11/2010 | Ida | |
| 2012/0264492 A1* | 10/2012 | Stewart | 455/575.2 |
| 2013/0064410 A1* | 3/2013 | Alstad | 381/374 |
| 2013/0112195 A1* | 5/2013 | Smith | 128/202.13 |

OTHER PUBLICATIONS

Gupta, Puneet, "Personal Area Networks: Say It and You are Connected!" Aug. 2009. Online article accessed at http://web.archive.org/web/20090830070124/http://www.wirelessdevnet.com/channels/bluetooth/features/pans.html. Wireless Developer Network—MindSites Group, LLC. Niceville, FL.

EP Search Report issued Apr. 18, 2013 in re EP Application No. 12007736.7 filed Nov. 15, 2012.

* cited by examiner

CAPACITIVE DATA TRANSFER THROUGH A USER'S BODY

RELATED APPLICATIONS

This application claims the benefits under 35 U.S.C. §119 (e) of U.S. Provisional Patent Application Ser. No. 61/578,922, filed Dec. 22, 2011, which is incorporated herein by reference in its entirety.

FIELD OF THE INVENTION

The present invention relates generally to wireless communication devices, and particularly to cellular telephones configured to communicate with a hands-free visor using the user's body as a communications medium.

BACKGROUND

There are many different methods for transmitting data between two or more devices. For example, two devices that are many miles apart from each other can communicate data via a wireless communication network. For shorter distances, such as a few tens of meters or less, the devices may utilize BLUETOOTH or WiFi protocols. In cases where the two devices are in contact, or nearly in contact with each other, Near Field Communication (NFC) may be utilized to send and receive data. Each of these communications methods is well known and very useful. However, they do present certain problems.

For example, security of one's private data is of paramount importance when using cellular, BLUETOOTH, and WiFi protocols to exchange data. Thus, protocols such as these typically utilize complicated algorithms and encoding schemes to protect against malicious eavesdropping attacks. Further, both methods utilize relatively large amounts of power, which can be a premium resource where cellular devices and/or their accessory devices are concerned. The uses of NFC technology helps mitigate some of these problems because NFC equipped devices need little energy. Additionally, because the distance over which an NFC transmission must travel is so short (i.e., usually up to only a few centimeters), security is not generally a concern. However, the maximum data rate of 0.5 Mbps is typically too low for many applications, and is lower than BLUETOOTH and WiFi.

Recently, consumers have started purchasing certain types of accessories for their mobile phones. One of the most popular accessories is a hands-free visor. With such visors, which may be embodied as glasses, for example, data sent from a user's mobile device is displayed on an interior surface of the glasses where the user can view the data. Additionally, some visors are equipped with camera circuitry to capture an image of whatever is in the field of view of the user. As useful as they are, however, visors are conventionally linked to the mobile phone via a BLUETOOTH link or physical cabling. Further, the visors also require a power source. Thus, both the mobile phones and the visors remain affected by security and power consumption concerns.

SUMMARY

The present invention provides a system and method for transmitting data through a user's body. In one embodiment, the method for communicating data between a user's wireless communication device and a hands-free visor comprises establishing a Personal Area Network (PAN) between a user's wireless communication device and a hands-free visor, wherein the PAN comprises a bi-directional communication link through the user's body. Once established, the present invention communicates data with the hands-free visor via the bi-directional communication link.

The data to be transmitted may comprise any data known in the art. However, in one embodiment, the data comprises image data that is transmitted to and received from the hands-free visor. In another embodiment, the data comprises audio data that is transmitted to and received from the hands-free visor.

In one embodiment, the method further comprises establishing a short-range communications link between the wireless communication device and the hands-free visor, and selectively transmitting the data to the hands-free visor via one of the PAN and the short-range communications link. The short-range communications link may comprise, in at least one embodiment, one of a Bluetooth link and a WiFi link.

In one embodiment, selectively transmitting the data to the hands-free visor comprises determining whether a rate at which the data is to be transmitted to the hands-free visor exceeds a predetermined bit-rate threshold value, transmitting the data to the hands-free visor via the PAN if the rate does not exceed the bit-rate threshold value, and transmitting the data to the hands-free visor via the short-range communications link if the rate exceeds the bit-rate threshold value. Thus, the selection of whether to transmit data to the hands-free visor using the PAN or the short-range interface is based on the transmit data rate.

In one embodiment, selectively transmitting the data to the hands-free visor comprises determining a current transmit power level for the wireless communications device, transmitting the data to the hands-free visor via the PAN if the current transmit power level exceeds a predetermined threshold, and transmitting the data to the hands-free visor via the short-range communications link if the current transmit power level does not exceed the predetermined threshold.

The present invention also provides a wireless communication device comprising a Personal Area Network (PAN) transceiver and a controller. The controller is configured to establish a bi-directional communication link through a user's body with a corresponding PAN transceiver at the hands-free visor and control the PAN transceiver to transmit data to and receive data from the hands-free visor via the bi-directional communication link.

In one embodiment, the wireless communication device further comprises a short-range transceiver. In such embodiments, the controller is further configured to establish a short-range air-interface link with a corresponding short-range transceiver disposed in the hands-free visor and selectively transmit the data to the hands-free visor via one of the PAN and the short-range air-interface link.

In one embodiment, the controller is further configured to determine whether a rate at which the data is to be transmitted to the hands-free visor exceeds a predetermined bit-rate threshold value, transmit the data to the hands-free visor via the PAN transceiver if the rate does not exceed the bit-rate threshold value, and transmit the data to the hands-free visor via the short-range transceiver if the rate exceeds the bit-rate threshold value.

In one embodiment, the controller is further configured to determine a current transmit power level for the wireless communications device, transmit the data to the hands-free visor via the PAN if the current transmit power level exceeds a predetermined threshold, and transmit the data to the hands-free visor via the short-range communications link if the current transmit power level does not exceed the predetermined threshold.

In addition, the present invention also provides a method for communicating data between a user's wireless communication device and a hands-free visor. In one embodiment of the present invention, the method comprises establishing a Personal Area Network (PAN) between a user's wireless communication device and a hands-free visor, in which the PAN comprises a bi-directional communication link through the user's body, and communicating data with the wireless communication device via the bi-directional communication link.

In one embodiment, communicating data with the wireless communication device comprises transmitting and receiving image data to and from the wireless communication device. However, in another embodiment, communicating data with the wireless communication device comprises transmitting and receiving audio data to and from the wireless communication device.

In one embodiment, the method further comprises establishing a short-range communications link between the wireless communication device and the hands-free visor, and selectively transmitting the data to the wireless communication device via one of the PAN and the short-range communications link. The short-range communications link may, in one embodiment, comprise one of a Bluetooth link and a WiFi link.

In one embodiment, selectively transmitting the data to the wireless communication device comprises determining whether a rate at which the data is to be transmitted to the wireless communication device exceeds a predetermined bit-rate threshold value, transmitting the data to the wireless communication device via the PAN if the rate does not exceed the bit-rate threshold value, and transmitting the data to the wireless communication device via the short-range communications link if the rate exceeds the bit-rate threshold value.

In another embodiment, selectively transmitting the data to the wireless communication device comprises determining a current transmit power level for the hands-free visor, transmitting the data to the wireless communication device via the PAN if the current transmit power level exceeds a predetermined threshold, and transmitting the data to the wireless communication device via the short-range communications link if the current transmit power level does not exceed the predetermined threshold.

Additionally, the present invention also provides a hands-free visor accessory device for a wireless communication device. In one embodiment, the accessory device comprises a Personal Area Network (PAN) transceiver and a controller. The controller is configured to establish a bi-directional communication link through a user's body with a corresponding PAN transceiver at the wireless communications device, and control the PAN transceiver to transmit data to and receive data from the wireless communications device via the bi-directional communication link.

In one embodiment, the accessory device also comprises a short-range transceiver. In such embodiments, the controller is further configured to establish a short-range air-interface link with a corresponding short-range transceiver disposed in the wireless communications device, and selectively transmit the data to the wireless communications device via one of the PAN and the short-range air-interface link.

In one embodiment, the controller is further configured to determine whether a rate at which the data is to be transmitted to the wireless communications device exceeds a predetermined bit-rate threshold, transmit the data to the wireless communications device via the PAN transceiver if the rate does not exceed the predetermined bit-rate threshold, and transmit the data to the wireless communications device via the short-range transceiver if the rate exceeds the predetermined bit-rate threshold.

However, in another embodiment, the controller is further configured to determine a current transmit power level for the accessory device, transmit the data to the wireless communications device via the PAN if the current transmit power level exceeds a predetermined threshold, and transmit the data to the wireless communications device via the short-range communications link if the current transmit power level does not exceed the predetermined threshold.

Of course, those skilled in the art will appreciate that the present invention is not limited to the above contexts or examples, and will recognize additional features and advantages upon reading the following detailed description and upon viewing the accompanying drawings.

DETAILED DESCRIPTION

The present invention provides a system and method for communicating data in a full-duplex mode between a user's wireless communications device and a hands-free visor worn by the user. However, rather than conventionally communicate the data via an air-interface using only a short-range communications protocol, such as BLUETOOTH, for example, the present invention selectively communicates the data using the user's own body as a propagation medium. That is, the present invention monitors parameters related to the function of the wireless communication device and/or the hands-free visor, and based on those parameters, selects an appropriate method by which to transmit the data. The data that is communicated may be, for example, image data or audio data, and may be rendered to the user upon receipt at the hands-free visor.

Such selective communications provides benefits not realized by conventional methods of communicating data (e.g., solely via BLUETOOTH). Particularly, because the present invention may communicate data through the user's body, the data is more secure and far less likely to be the subject of a malicious eavesdropping attack. Further, such transmissions may not be as susceptible to external interference. Moreover, the components used to communicate data through the user's body use far less power than conventional transceivers. Therefore, selecting to transmit data via the user's body, under certain circumstances, may help to prolong the life of the battery resources as well as help to ensure that the receiving device (i.e., the hands-free device and the wireless communication device) receives the data clearly.

Figure 1:
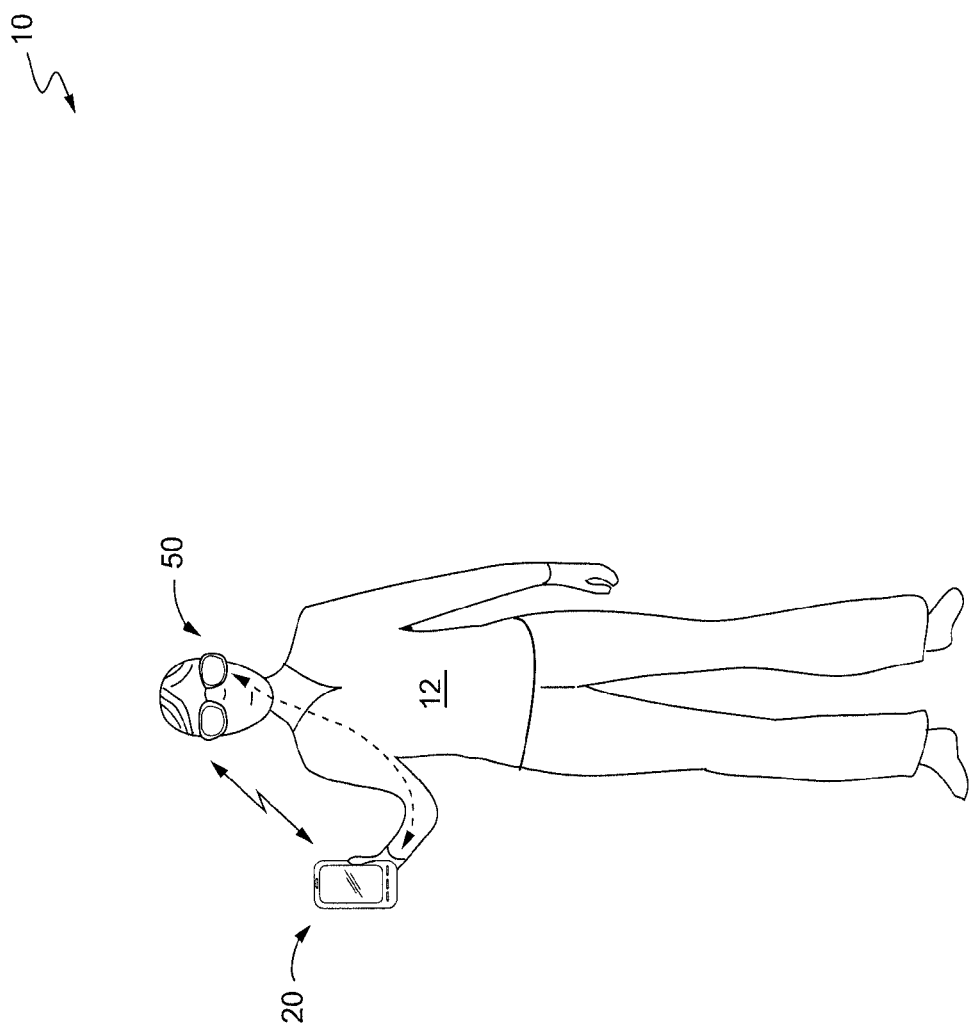
FIG. 1 is a perspective view of a cellular telephone and a hands-free visor configured to communicate data in a full-duplex mode using a user's body as a communications medium.

Turning now to the drawings, FIG. 1 illustrates a perspective view of a system 10 configured according to one embodiment of the present invention. As seen in FIG. 1, a user 12 has a wireless communication device, which is embodied here as a cellular telephone 20, and a hands-free visor 50 that is worn on the user's head. Conventionally, the cellular telephone 20 could transmit data to the hands-free visor 50 over an air-interface according to a short-range communications protocol, such as the well-known BLUETOOTH protocol. With the present invention, however, the cellular telephone 20 is also configured to selectively communicate that data with the hands-free visor 50 via the user's body.

More specifically, both the cellular telephone 20 and the hands-free visor 50 comprise a Personal Area Network (PAN) transceiver. To communicate data through the user's body, the PAN transceivers capacitively couple a small displacement current through the user's body. The device transmitting the data (i.e., the cellular telephone 20 or the hands-free visor 50) modulates the displacement current, which the other PAN transceiver receives, thereby transferring the data through the user's body.

It should be noted here that PANs are sometimes confused with BLUETOOTH technology, and the two are sometimes referred to interchangeably. However, the two concepts are very different and not the same. Personal Area Networks, such as those established in the present invention, establish near-field electric fields to transfer data to other devices using the human body as a propagation medium. BLUETOOTH, in contrast, is a far-field technology that enables the communication of data over an air-interface. Thus, in accordance with the accepted understanding of the term by those of ordinary skill in the art, PAN is used herein to refer to those communications that use a biological body, such as the user's own body, as a medium to propagate transmitted data.

Figure 2:
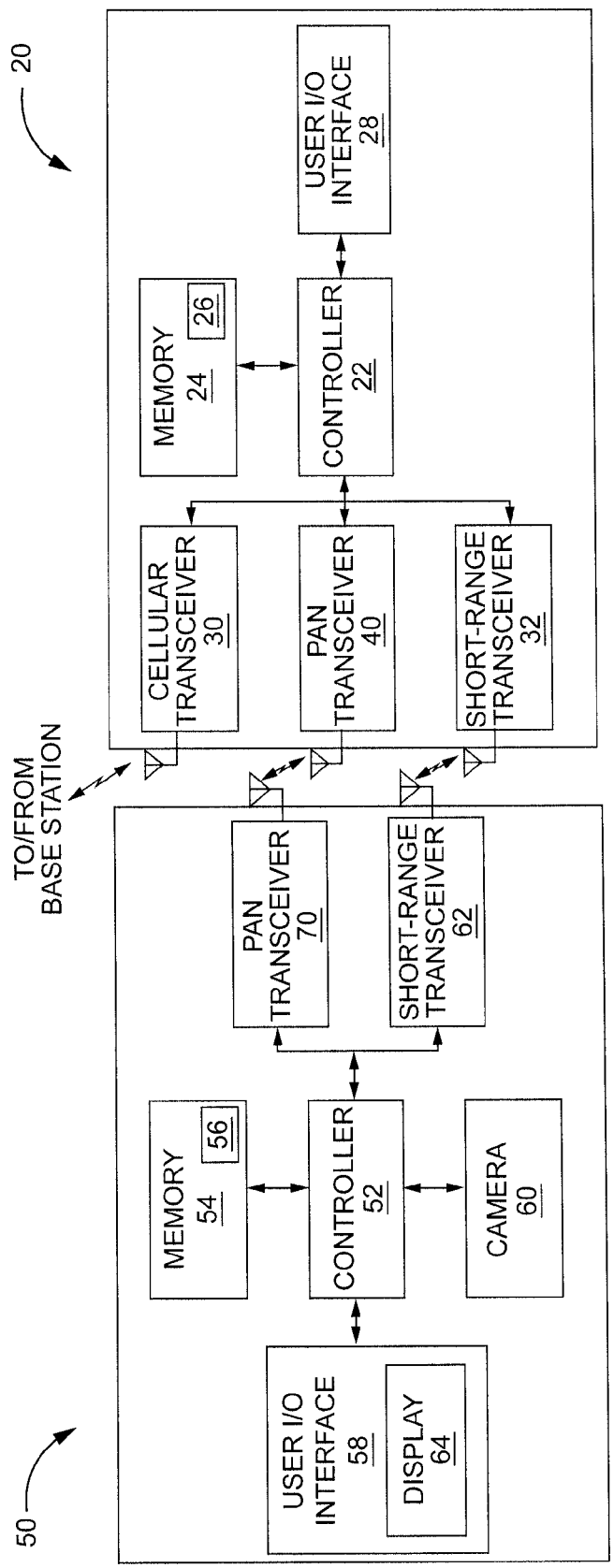
FIG. 2 is a functional block diagram illustrating some functional components of a wireless communication device and a hands-free visor configured according to one embodiment of the present invention.

FIG. 2 is a functional block diagram illustrating some of the components of the cellular telephone 20 and the hands-free visor 50 configured to operate according to one embodiment of the present invention. As seen in FIG. 2, cellular telephone 20 comprises a programmable controller 22, a memory 24, a user I/O interface 28, and a plurality of transceivers 30, 32, and 40 configured to transmit and receive data using respective technologies.

Controller 22 generally controls the operation of the cellular telephone 20 according to programs and data stored in memory 24. Such programs and data include, but are not limited to, one or more configuration tables 26 that, as described in more detail later, may be utilized to selectively determine how to transmit given data (i.e., via PAN or short-range transceiver). The control functions performed by controller 22 may be implemented, for example, in a single microprocessor, or in multiple microprocessors. Suitable microprocessors may include general purpose and special purpose microprocessors, as well as digital signal processors. Additionally, controller 22 may interface with an audio processing circuit (not shown) as is known in the art, to provide basic analog output signals to a speaker (not shown) and receive analog audio inputs from a microphone (not shown).

Memory 24 is a computer readable medium representing the entire hierarchy of memory in, or accessible to, cellular telephone 20. Memory 24 may comprise both random access memory (RAM) and read-only memory (ROM), and may be implemented, for example, as one or more discrete devices, stacked devices, or removable devices, such as a flash drive or memory stick. In one embodiment, the memory 24 may be integrated with controller 22.

As previously stated, the configuration tables 26 may be stored in memory 24. These tables contain information, which may or may not be provisioned and/or updated by the user, that is used to identify whether given data is to be transmitted between the wireless communication device 20 and the hands-free visor 50 via the PAN (i.e., using the user's body as a communications medium), or via an established short-range communications link (e.g., using BLUETOOTH). By way of example, the information in the configuration tables 26 may contain one or more bit-rate threshold values and/or transmit power level threshold values for the cellular telephone 20. According to one or more embodiments of the present invention, different parameter values associated with the cellular telephone 20 and/or hands-free visor 50 are periodically monitored and compared against the corresponding threshold values in the configuration tables 26. Based on such comparisons, the controller 22 is configured to selectively transmit the given data using one of the transceivers 30, 32, 40.

The User I/O interface 28 provides a user with the necessary components to interact with the cellular telephone 20. Typically, the UI 28 includes a display, a speaker, a microphone, and a variety of controls, which may include, but is not limited to, a keypad or buttons.

The plurality of transceivers includes a cellular transceiver 30, a short-range transceiver 32, and a PAN transceiver 40. The cellular transceiver 30 may comprise any transceiver for transmitting and receiving data, such as downloaded video and/or audio content, for example, to and from a base station in a wireless communications network. Thus, in one embodiment, the cellular transceiver 30 comprises a fully functional cellular radio transceiver that operates according to any known standard. Such standards include, but are not limited to, the Global System for Mobile Communications (GSM), TIA/EIA-136, cdmaOne, cdma2000, UMTS, and Wideband CDMA.

The short-range transceiver 32 comprises any short-range transceiver operating according to Wi-Fi standards, BLUETOOTH standards, or any standard associated with the IEEE 802.xx family of standards. As seen in FIG. 2, the short-range transceiver 32 communicates data with a corresponding short-range transceiver 62 associated with the hands-free visor 50. As known in the art, short-range transceivers 32, 62 generally follow a well-known protocol, such as BLUETOOTH, to establish and maintain a two-way communication channel, and to communicate data. According to the present invention, the controller 22 may monitor predefined functional aspects of cellular telephone 20 (e.g., the transmit power level and/or the transmit data rate and the like) and selectively use the short-range transceiver 32 to transmit data based on that monitoring. By way of example only, the controller 22 may select the short-range transceiver 32 to transmit data to the hands-free visor 50 if the data to be transmitted is to be sent at a rate that is higher than some predefined threshold (e.g., 10 Mbps), or if the transmit power level of the cellular telephone 20 falls below a predetermined transmit power level threshold value.

The PAN transceiver 40 is capable of performing both transmit and receive functions to communicate data with the corresponding PAN transceiver 70 of the hands-free visor. However, as stated above, the PAN transceivers utilize the user's body as a communication medium rather than an air interface. More specifically, the PAN transceiver 40 generates a small current and sends the current through the user's body. To transfer data, the PAN transceiver 40 modulates the current according to the data. This method of transmission requires far less power than do conventional methods that communicate data over an air-interface. Thus, PAN transmissions helps to save battery resources. Further, because the PAN transceiver 40 communicates data through the user's body, security of the data is of little concern.

The hands-free device 50 comprises a controller 52, a memory 54 a User I/O Interface 58 having a display 64, and a camera 60. The controller 52 may comprise a programmable microprocessor, for example, and is configured to control the operations of the hands-free visor 50 according to the data and instructions stored in memory 54. As above, such programs and data include, but are not limited to, one or more configuration tables 56 that may be utilized by controller 52 to selectively determine how to transmit given data (i.e., via the short-range transceiver 62 or the PAN transceiver 70). Suitable microprocessors may include general purpose and special purpose microprocessors, as well as digital signal processors.

As is conventional, the controller 52 provides signals to the User I/O Interface 58 to display data on the display 64. These signals are generally received from the cellular telephone 20 via the short-range transceiver 62 or the PAN transceiver 70, as described in more detail below. In addition, however, the cellular telephone 20 may also provide audio data to the visor 50. In these cases, the hands-free visor 50 will also include one or more speakers (e.g., speaker buds) for insertion into the user's ear. The controller 52 could interface with the speakers as is known in the art, and provide basic analog output signals to the speaker for output to the user. In other embodiments, the hands-free visor 50 comprises a microphone (not shown). The controller 52 could be configured to receive the audio signals generated by the microphone and send them to the cellular telephone 20. Similarly, the controller 52 could generate signals to transmit one or more images captured by the camera 60 at the hands-free device to the cellular telephone via the short-range or PAN transceivers. As described in more detail later, the controller 52 may generate one or more control signals to selectively transmit data to the cellular telephone 20 via one of the short-range transceiver 62 and the PAN transceiver 70.

Memory 54 is a computer readable medium representing the entire hierarchy of memory in, or accessible to, the hands-free visor 50. Memory 54 may comprise both random access memory (RAM) and read-only memory (ROM), and may be implemented, for example, as one or more discrete devices, stacked devices, or removable devices, such as a flash drive or memory stick. In one embodiment, the memory 54 may be integrated with controller 52.

The configuration tables 56 may also be stored in memory 54. As above, the configuration tables 56 may contain information that may be provisioned and/or updated by the user. The information may comprise data defining one or more bit-rate threshold values and/or transmit power level threshold values. The controller in the hands-free device 50 is configured to monitor and compare values indicative of certain functional aspects of the hands-free device 50 to corresponding threshold value(s) in the configuration tables 56, and based on the comparison, transmit the given data using a selected one of the transceivers 62 and 70.

The transceivers include a short-range transceiver 62 and a PAN transceiver 70. The short-range transceiver 62, which may, for example, operate according to Wi-Fi standards, BLUETOOTH standards, or any standard associated with the IEEE 802.xx family of standards, communicates data with the corresponding short-range transceiver 32 associated with the cellular telephone 20. Similarly, the PAN transceiver 70 communicates data with the corresponding PAN transceiver 40 of the cellular telephone. As stated above, the short-range transceiver 62 transmits and receives data to and from the cellular telephone 20 via an air-interface, while the PAN transceiver 70 communicates data through the user's body.

In one embodiment of the present invention, the controller 52 monitors the function of the hands-free visor 50 and selectively uses the short-range transceiver 62 or the PAN transceiver 70 to transmit data based on that determination. As above, the controller 52 may use the short-range transceiver 62 to transmit data to the cellular telephone 20 if the data to be transmitted is to be sent at a rate that exceeds a predetermined data rate, or if the transmit power level of the hands-free visor 50 falls below a predetermined level.

Figure 3:
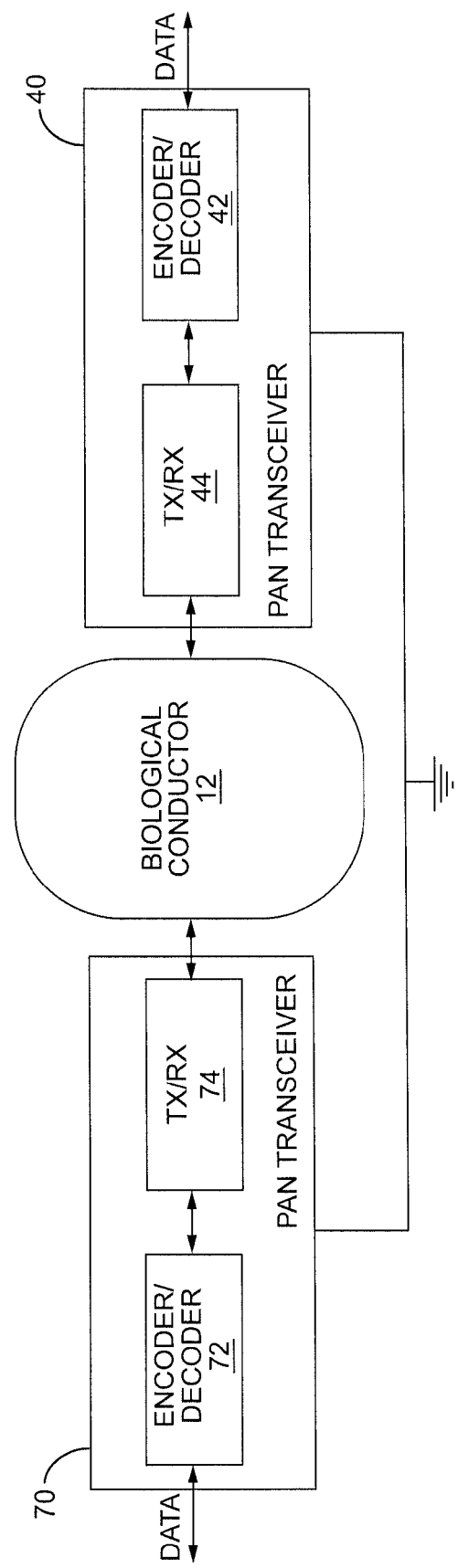
FIG. 3 is a functional block diagram illustrating some component parts of the Personal Area Network (PAN) transceivers in the users wireless communications device and the hands-free visors according to one embodiment of the present invention.

FIG. 3 is a functional block diagram illustrating the PAN transceivers 40, 70 communicating data through a biological conductor (i.e., the user's body 12) according to one embodiment of the present invention. The operation of a PAN transceiver is well known in the art, and thus, a detailed discussion in not presented here. However, the interested reader is referred to the paper authored by T. G. Zimmerman entitled, "Personal Area Networks: Near-field intrabody communication." This paper was published in 1996 in Volume 35, Nos. 3-4, of the IBM Systems Journal, and is incorporated herein by reference in its entirety.

As seen in FIG. 3, each PAN transceiver 40, 70 is grounded and comprises a respective encoder/decoder function 42, 72, and a transmitter/receiver circuit 44, 74. Further, although not specifically seen in the figures, both PAN transceivers 40, 70 are powered by their respective battery sources. In operation, the encoder/decoders 42, 72 receive data from their respective devices (i.e., either the cellular telephone 40 or the hands-free visor 50) and encode the data for transmission. The encoded data is then passed to the transmitter/receiver circuit 44, 74, which converts the data into an electric current, modulates the electric current, and transmits the modulated current through the user's body 12. When receiving data, the transmitter/receiver 44, 74 demodulates the modulated signals, decodes the signal using encoder/decoder 42, 72, and then renders the data to the user. For example, audio and/or video data received at the hands-free visor 50 may be sent to a pair of speakers and the display portion of the glasses where it is rendered for the user. Images and sounds captured by the microphone and camera at the hands-free visor 50 and received at the cellular telephone 20 may be stored in memory 24 and/or displayed to the user.

The PAN transceivers 40, 70 may operate within the range of any desired frequencies. However, in one embodiment the PAN transceivers 40, 70 operate in a frequency range of 30-150 MHz. Additionally, the PAN transceivers 40, 70 may utilize any modulation strategies to modulate the electrical current, such as on-off keying, for example.

Figure 4:
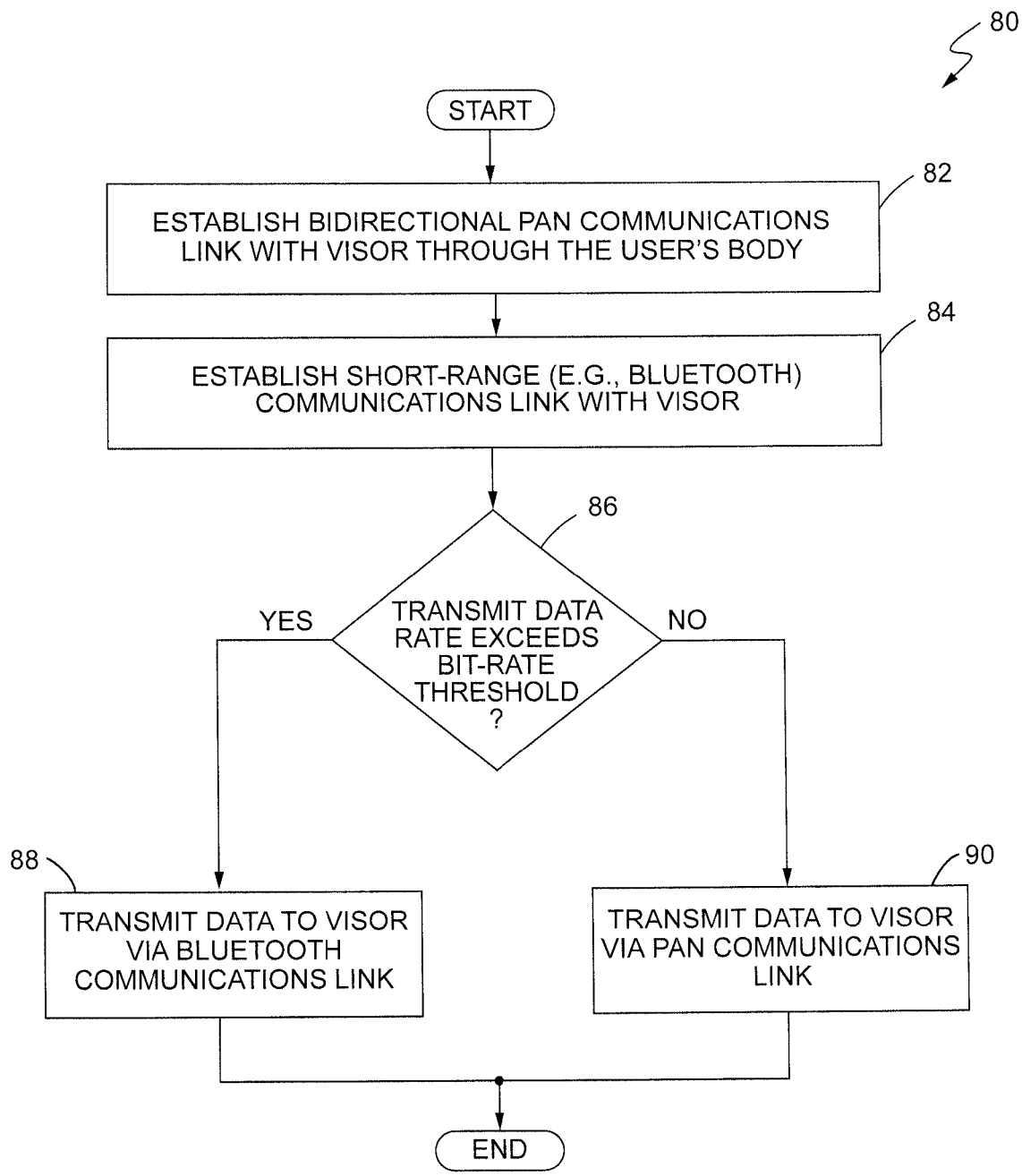
FIG. 4 is a flow chart illustrating a method of selectively transmitting data to the hands-free visor according to one embodiment of the present invention.

As previously stated, the controller 22 of the cellular telephone 20 may be configured to select to transmit the data via PAN transceiver 40 through the user's body to the hands-free visor, or via the short-range transceiver 32 to the hands-free visor, based on certain predefined criteria. FIG. 4 is a flow chart that illustrates a method of performing this function. Those skilled in the art will understand that FIG. 4 is described as if the controller 22 performs the determination and selection functions. However, this is for illustrative purposes only. The controller 52 at the hands-free visor 70 may also be configured to perform these functions.

Method 80 begins with the controller 22 at the cellular telephone 20 establishing a bidirectional communications link with the hands-free visor 50 through the user's body (box 82). The controller 22 also establishes a different short-range communications link (e.g., BLUETOOTH) with the hands-free visor 50 (box 84). As previously stated, the processes and requirements for establishing and maintaining these communication links is well known in the art, and thus, not described in detail here.

When the cellular telephone 20 has data to send, such as video or audio data, the controller 22 may first determine the rate at which the data is to be transmitted. For example, different types of data may be sent at different data rates. The controller 22 could query the configuration tables 26 stored in memory 24 to determine the rate at which the particular data is to be sent, and further, whether that rate exceeds a predefined data rate (box 86). If the rate at which the data is to be sent to the hands-free visor 50 exceeds a predetermined bit-rate threshold value (box 86), the controller 22 will transmit the data to the hands-free visor 50 via the short-range (e.g., BLUETOOTH) link. However, if the rate at which the data is to be sent to the hands-free device 50 does not exceed the predetermined bit-rate threshold value (box 86), then the controller 22 will select the PAN transceiver 40 to transmit the data through the user's body, as previously described (box 90).

Figure 5:
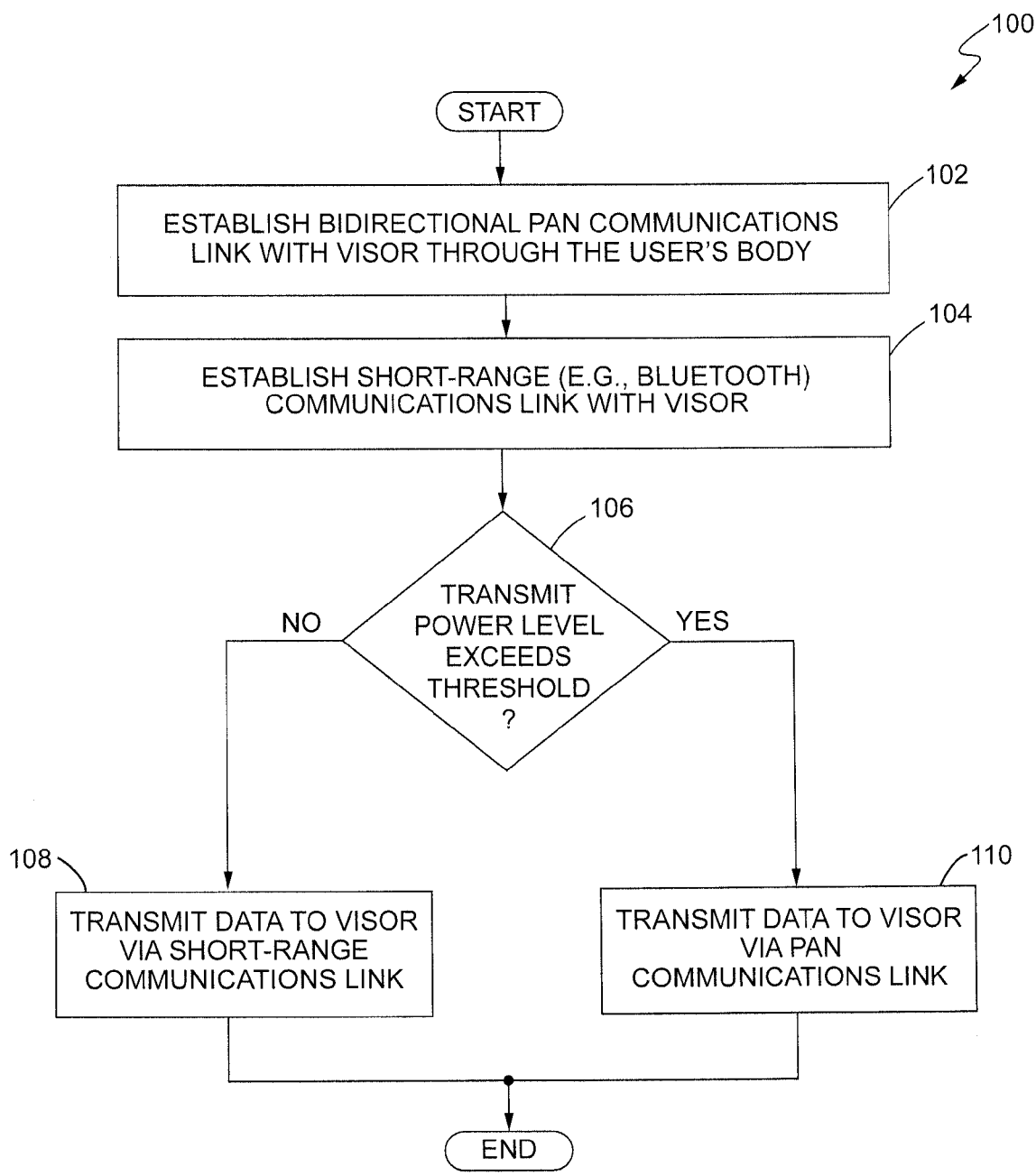
FIG. 5 is a flow chart illustrating a method of selectively transmitting data to the hands-free visor according to another embodiment of the present invention.

FIG. 5 illustrates another embodiment wherein the cellular telephone 22 selects a transmission method (i.e., PAN transceiver 40 or short-range transceiver 70) based on a determination of the current transmit power level. Particularly, the present invention associates the transmit power level of the cellular telephone 20 to the quality of the communication link over which it communicates data with the hands-free device 50. Such links may be negatively affected by various external factors such as interference. As these links deteriorate, the cellular telephone 20 may compensate by increasing its transmit power level. The cellular telephone 20 monitors the transmit power level, and when it exceeds a predetermined transmit power level threshold, the controller 22 switches to the PAN transceiver 40 to transmit the data.

Method 100 begins with controller 22 establishing a bidirectional PAN communications link through the user's body (box 102) and a short-range (e.g., BLUETOOTH) communications link (box 104) as previously described. Controller 22 periodically monitors the quality of the BLUETOOTH link. When the controller 22 has data to transmit to the hands-free visor 50, the controller will compare the current transmit power level of the wireless communications device 20 to a predetermined threshold value stored in the configuration tables 26 (box 106). Any circuitry known in the art may be utilized to monitor the transmit power level, and the threshold value may be set, for example, by the user. If the current transmit power level does not exceed the predetermined threshold, the controller 22 may determine that the BLUETOOTH link has not deteriorated and control the short-range transceiver 32 to transmit the data to the hands-free visor 50 via the established air interface (box 108). Otherwise, the controller 22 may determine that the quality of the BLUETOOTH link is unacceptable for data transmission, and thus, control the PAN transceiver 40 to send the data to the hands-free visor 50 through the user's body 12 via the PAN communications link (box 110).

It should be noted that the method 100 of FIG. 5 is described from the context of the wireless communications device 20. However, those of ordinary skill in the art should readily appreciate that the invention is not so limited. In one or more embodiments, the hands-free device 50 may perform the methods illustrated in FIGS. 4 and 5.

Figure 6B:
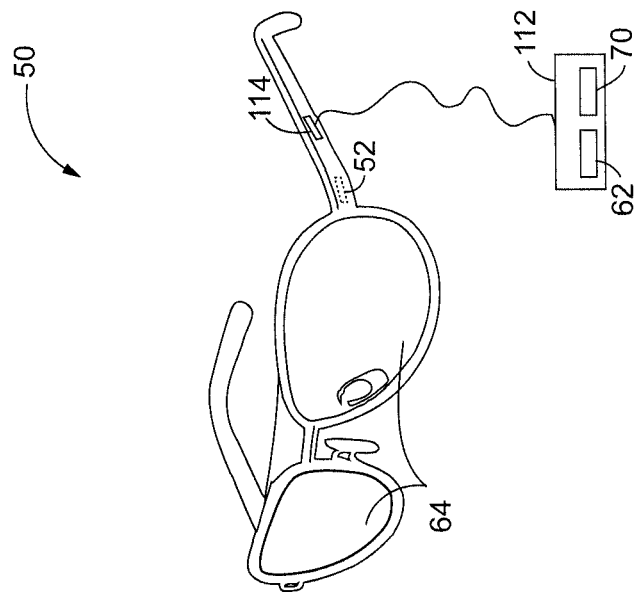
FIGS. 6A and 6B are perspective views illustrating hands-free visors configured to communicate in a full-duplex mode with a user's wireless communication device selectively using a PAN transceiver according to embodiments of the present invention.
Figure 6A:
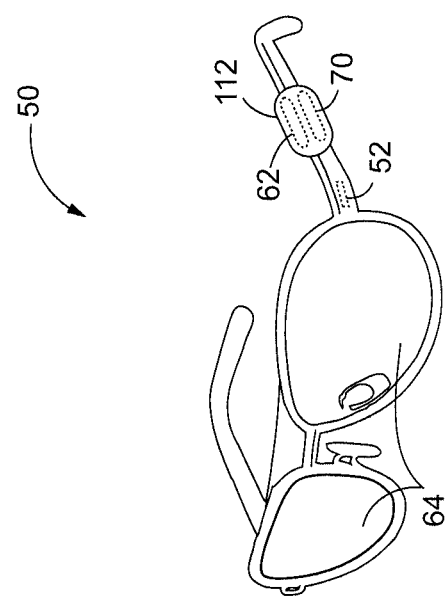

The present invention may, of course, be carried out in other ways than those specifically set forth herein without departing from essential characteristics of the invention. For example, the previous embodiments illustrate the PAN transceiver 70 as being integrated into the hands-free visor 50. However, those skilled in the art should appreciate that the present invention is not limited to these embodiments. FIG. 6A illustrates another embodiment in which the PAN transceiver 70 and the short-range transceiver 62 are enclosed in a separate module 112 that attaches to the hands-free visor 50. FIG. 6B illustrates an embodiment in which the module 112 connects to the hands-free visor 50 via a cable that plugs into a port 114. Regardless of whether the PAN transceiver 70 is integrated into the hands-free visor 50, or is separate from and attached to the hands-free visor 50, the PAN transceivers 40, 70 of the present invention are selectively controlled to communicate data through the user's body.

Therefore, the present embodiments are to be considered in all respects as illustrative and not restrictive, and all changes coming within the meaning and equivalency range of the appended claims are intended to be embraced therein

What is claimed is:

1. A method for communicating data between a user's wireless communication device and a hands-free visor, the method comprising:
    establishing a Personal Area Network (PAN) between a user's wireless communication device and a hands-free visor, the PAN comprising a bi-directional communication link through the user's body;
    establishing a short-range communications link between the wireless communication device and the hands-free visor; and
    selectively transmitting the data to the hands-free visor via one of the PAN and the short-range communications link based on at least one of:
        a comparison between a rate at which the data is to be transmitted to the hands-free visor and a predetermined bit-rate threshold; and
        a comparison between a current transmit power level for the wireless communications device and a predetermined power level threshold.

2. The method of claim 1 wherein communicating data with the hands-free visor comprises transmitting and receiving image data to and from the hands-free visor.

3. The method of claim 1 wherein communicating data with the hands-free visor comprises transmitting and receiving audio data to and from the hands-free visor.

4. The method of claim 1 wherein the short-range communications link comprises one of a Bluetooth link and a WiFi link.

5. The method of claim 1 wherein selectively transmitting the data to the hands-free visor via one of the PAN and the short-range communications link comprises:
    determining whether the rate at which the data is to be transmitted to the hands-free visor exceeds the predetermined bit-rate threshold value;
    transmitting the data to the hands-free visor via the PAN if the rate does not exceed the bit-rate threshold value; and
    transmitting the data to the hands-free visor via the short-range communications link if the rate exceeds the bit-rate threshold value.

6. The method of claim 1 wherein selectively transmitting the data to the hands-free visor via one of the PAN and the short-range communications link comprises:
   determining the current transmit power level for the wireless communications device;
   transmitting the data to the hands-free visor via the PAN if the current transmit power level exceeds the predetermined power level threshold; and
   transmitting the data to the hands-free visor via the short-range communications link if the current transmit power level does not exceed the predetermined power level threshold.

7. A wireless communication device comprising:
   a Personal Area Network (PAN) transceiver;
   a short-range transceiver; and
   a controller configured to:
      establish a bi-directional communication link through a user's body with a corresponding PAN transceiver at the hands-free visor;
      establish a short-range air-interface link with a corresponding short-range transceiver disposed in the hands-free visor; and
      selectively transmit the data to the hands-free visor via one of the PAN and the short-range air-interface link based on at least one of:
         a comparison between a rate at which the data is to be transmitted to the hands-free visor and a predetermined bit-rate threshold; and
         a comparison between a current transmit power level for the wireless communications device and a predetermined power level threshold.

8. The wireless communication device of claim 7 wherein the controller is further configured to:
   determine whether the rate at which the data is to be transmitted to the hands-free visor exceeds the predetermined bit-rate threshold value;
   transmit the data to the hands-free visor via the PAN transceiver if the rate does not exceed the bit-rate threshold value; and
   transmit the data to the hands-free visor via the short-range transceiver if the rate exceeds the bit-rate threshold value.

9. The wireless communication device of claim 7 wherein the controller is further configured to:
   determine the current transmit power level for the wireless communications device;
   transmit the data to the hands-free visor via the PAN if the current transmit power level exceeds the predetermined power level threshold; and
   transmit the data to the hands-free visor via the short-range communications link if the current transmit power level does not exceed the predetermined power level threshold.

10. A method for communicating data between a user's wireless communication device and a hands-free visor, the method comprising:
   establishing a Personal Area Network (PAN) between a user's wireless communication device and a hands-free visor, the PAN comprising a bi-directional communication link through the user's body;
   establishing a short-range communications link between the wireless communication device and the hands-free visor; and
   selectively transmitting the data to the wireless communication device via one of the PAN and the short-range communications link based on at least one of:
      a comparison between a rate at which the data is to be transmitted to the wireless communication device and a predetermined bit-rate threshold; and
      a comparison between a current transmit power level for the hands-free visor and a predetermined power level threshold.

11. The method of claim 10 wherein communicating data with the wireless communication device comprises transmitting and receiving image data to and from the wireless communication device.

12. The method of claim 10 wherein communicating data with the wireless communication device comprises transmitting and receiving audio data to and from the wireless communication device.

13. The method of claim 10 wherein the short-range communications link comprises one of a Bluetooth link and a WiFi.

14. The method of claim 10 wherein selectively transmitting the data to the wireless communication device via one of the PAN and the short-range communications link comprises:
   determining whether the rate at which the data is to be transmitted to the wireless communication device exceeds the predetermined bit-rate threshold value;
   transmitting the data to the wireless communication device via the PAN if the rate does not exceed the bit-rate threshold value; and
   transmitting the data to the wireless communication device via the short-range communications link if the rate exceeds the bit-rate threshold value.

15. The method of claim 10 wherein selectively transmitting the data to the wireless communication device via one of the PAN and the short-range communications link comprises:
   determining the current transmit power level for the hands-free visor;
   transmitting the data to the wireless communication device via the PAN if the current transmit power level exceeds the predetermined power level threshold; and
   transmitting the data to the wireless communication device via the short-range communications link if the current transmit power level does not exceed the predetermined power level threshold.

16. A hands-free visor accessory device for a wireless communication device, the accessory device comprising:
   a Personal Area Network (PAN) transceiver;
   a short-range transceiver; and
   a controller configured to:
      establish a bi-directional communication link through a user's body with a corresponding PAN transceiver at the wireless communications device;
      establish a short-range air-interface link with a corresponding short-range transceiver at the wireless communications device; and
      selectively transmit the data to the wireless communications device via one of the PAN and the short-range air-interface link based on at least one of:
         a comparison between a rate at which the data is to be transmitted to the wireless communications device and a predetermined bit-rate threshold; and
         a comparison between a current transmit power level for the accessory device and a predetermined power level threshold.

17. The accessory device of claim 16 wherein the controller is further configured to:
   determine whether the rate at which the data is to be transmitted to the wireless communications device exceeds the predetermined bit-rate threshold;

transmit the data to the wireless communications device via the PAN transceiver if the rate does not exceed the predetermined bit-rate threshold; and transmit the data to the wireless communications device via the short-range transceiver if the rate exceeds the predetermined bit-rate threshold.

18. The accessory device of claim 16 wherein the controller is further configured to:

determine the current transmit power level for the accessory device;

transmit the data to the wireless communications device via the PAN if the current transmit power level exceeds the predetermined power level threshold; and transmit the data to the wireless communications device via the short-range communications link if the current transmit power level does not exceed the predetermined power level threshold.

* * * * *